(12) United States Patent
Madar, III et al.

(10) Patent No.: US 11,714,477 B2
(45) Date of Patent: *Aug. 1, 2023

(54) LOW-POWER AMBIENT COMPUTING SYSTEM WITH MACHINE LEARNING

(71) Applicant: Google LLC, Mountain View, CA (US)

(72) Inventors: Lawrence J. Madar, III, San Francisco, CA (US); Manu Gulati, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,332

(22) Filed: Nov. 10, 2021

(65) Prior Publication Data

US 2022/0066536 A1    Mar. 3, 2022

Related U.S. Application Data

(63) Continuation of application No. 16/479,901, filed as application No. PCT/US2018/062329 on Nov. 21, 2018, now Pat. No. 11,199,896.
(Continued)

(51) Int. Cl.
*G06F 1/32* (2019.01)
*G06F 1/3293* (2019.01)
(Continued)

(52) U.S. Cl.
CPC .......... *G06F 1/3293* (2013.01); *G06F 1/3215* (2013.01); *G06F 1/3228* (2013.01);
(Continued)

(58) Field of Classification Search
CPC .... G06F 1/3293; G06F 1/3215; G06F 1/3228; G06F 1/3231; G06F 1/3287;
(Continued)

(56) References Cited

U.S. PATENT DOCUMENTS 6,529,887 B1    3/2003  Doya et al.
9,710,265 B1 *  7/2017  Temam ................. G06F 9/3824
(Continued)

FOREIGN PATENT DOCUMENTS

CN    103714039    4/2014
JP    2001-238001    8/2001
(Continued)

OTHER PUBLICATIONS

International Preliminary Report on Patentability in International Appln. No. PCT/US2018/062329, dated May 26, 2020, 17 pages.
(Continued)

*Primary Examiner* — Volvick Derose
(74) *Attorney, Agent, or Firm* — Fish & Richardson P.C.

(57) ABSTRACT

Methods, systems, and apparatus, for handling applications in an ambient computing system. One of the methods includes determining, by a low-power processing component, that particular sensor signals have a particular property. In response, a machine learning engine performs an inference pass over a machine learning model using the sensor signals to generate a model output. If the model output of the machine learning engine matches an application-specific condition, one or more of the other processing components are activated to execute an particular application corresponding to the application-specific condition.

20 Claims, 6 Drawing Sheets

Related U.S. Application Data

(60) Provisional application No. 62/589,547, filed on Nov. 21, 2017.

(51) Int. Cl.

| | | |
|---|---|---|
| *G06N 20/00* | (2019.01) | |
| *G06F 1/3215* | (2019.01) | |
| *G06F 1/3228* | (2019.01) | |
| *G06F 1/3231* | (2019.01) | |
| *G06F 1/3287* | (2019.01) | |
| *G06N 5/04* | (2023.01) | |
| *G06F 1/3203* | (2019.01) | |

(52) U.S. Cl.
CPC .......... *G06F 1/3231* (2013.01); *G06F 1/3287* (2013.01); *G06N 5/04* (2013.01); *G06N 20/00* (2019.01); *G06F 1/3203* (2013.01)

(58) Field of Classification Search
CPC ........ G06F 1/3206; G06N 20/00; G06N 5/04; G06N 3/0445; G06N 3/063; Y02D 30/50; Y02D 10/00
USPC ........................................................ 713/320
See application file for complete search history.

(56) References Cited

U.S. PATENT DOCUMENTS

| | | | | |
|---|---|---|---|---|
| 2010/0332043 A1* | 12/2010 | Weyland | ............... | G06F 1/3203 700/291 |
| 2010/0332876 A1* | 12/2010 | Fields, Jr. | ............. | G06F 1/3203 713/323 |
| 2011/0239020 A1* | 9/2011 | Thomas | ................ | G06F 9/5094 713/323 |
| 2013/0046967 A1* | 2/2013 | Fullerton | .............. | H03L 7/0997 713/100 |
| 2014/0176572 A1* | 6/2014 | Vembu | ...................... | G06T 1/20 345/502 |
| 2014/0176573 A1 | 6/2014 | Vembu et al. | | |
| 2014/0347274 A1 | 11/2014 | Koh et al. | | |
| 2014/0351559 A1* | 11/2014 | Lautner | ................... | G06F 15/80 712/30 |
| 2015/0095678 A1* | 4/2015 | Nachman | .............. | G06F 1/3234 713/323 |
| 2015/0286263 A1* | 10/2015 | Heo | ...................... | G06F 1/3231 713/320 |
| 2015/0346001 A1* | 12/2015 | Tripathi | ................ | G06F 1/3206 702/190 |
| 2016/0132099 A1* | 5/2016 | Grabau | ................ | H04N 5/2256 713/323 |
| 2016/0187961 A1* | 6/2016 | Elibol | ................... | G06F 1/3203 345/173 |
| 2016/0239068 A1* | 8/2016 | Varma | ................... | G06F 1/3206 |
| 2017/0153992 A1* | 6/2017 | Nair | ...................... | G06F 1/3203 |
| 2017/0205863 A1* | 7/2017 | Lee | ........................ | G06F 1/3206 |
| 2017/0206464 A1* | 7/2017 | Clayton | ............... | G06N 3/0454 |
| 2018/0164871 A1* | 6/2018 | Chng | ..................... | G06F 1/3231 |
| 2018/0246696 A1* | 8/2018 | Sharma | ............... | G10L 19/0212 |
| 2020/0278738 A1* | 9/2020 | Madar, III | ............ | G06F 1/3206 |

FOREIGN PATENT DOCUMENTS

| | | |
|---|---|---|
| JP | 2017-520937 | 7/2017 |
| JP | 2017-167042 | 9/2017 |
| KR | 10-2015-0110653 | 10/2015 |
| KR | 10-2016-0145791 | 12/2016 |
| KR | 10-2017-0063595 | 6/2017 |
| TW | 200929096 | 7/2009 |
| TW | 201109912 | 3/2011 |
| TW | 201419036 | 5/2014 |
| TW | 201812608 | 4/2018 |
| TW | I630476 | 7/2018 |
| WO | WO 2015/183404 | 12/2015 |

OTHER PUBLICATIONS

International Search Report and Written Opinion in International Appln. No. PCT/US2018/062329, dated Apr. 10, 2019, 24 pages.
Office Action in European Appln. No. 18815917.2, dated Apr. 13, 2021, 9 pages.
Office Action in Indian Appln. No. 201947047313, dated Jul. 6, 2021, 6 pages (with English translation).
Office Action in Korean Appln. No. 10-2019-7034766, dated Mar. 9, 2021, 26 pages (with English translation).
Office Action in Taiwanese Appln. No. 108137926, dated Jun. 29, 2021, 5 pages (with English Search Report).
Oord et al., "WaveNet: A Generative Model for Raw Audio," arXiv, Sep. 2016, 15 pages.
Office Action in Taiwanese Appln. No. 110141124, dated Aug. 24, 2022, 8 pages (with English Search Report).
Notice of Allowance in Korean Appln. No. 10-2022-7004110, dated Oct. 12, 2022, 3 pages (with English translation).
Office Action in Japanese Appln. No. 2021-075031, dated Dec. 6, 2022, 6 pages (with English translation).
Garcia-Martin et al., "Estimation of energy consumption in machine learning." Journal of Parallel and Distributed Computing 134, 2019, 75-88.
Office Action in Indian Appln. No. 202148056432, dated Nov. 28, 2022, 6 pages (with English translation).
Notice of Allowance in Japanese Appln. No. 2021-075031, dated Mar. 7, 2023, 5 pages (with English translation).
Office Action in Chinese Appln. No. 201880035038.9, dated Dec. 1, 2022, 17 pages (with English translation).

* cited by examiner

LOW-POWER AMBIENT COMPUTING SYSTEM WITH MACHINE LEARNING

CROSS-REFERENCE TO RELATED APPLICATIONS

This application is a continuation application of, and claims priority to, U.S. patent application Ser. No. 16/479,901, filed Jul. 22, 2019, which is a national stage application under § 371 and which claims priority to International Application No. PCT/US2018/062329, filed Nov. 21, 2018, which claims the benefit under 35 U.S.C. § 119(e) of U.S. Provisional Application No. 62/589,547, filed Nov. 21, 2017. The disclosures of the prior applications are considered part of and are incorporated by reference in the disclosure of this application.

BACKGROUND

This specification relates to ambient computing.

Mobile computing devices, e.g., smart phones, personal digital assistants, electronic tablets, laptops, and the like, typically use power provided by one or more rechargeable batteries. A rechargeable battery provides only a finite amount of power to a device before the battery must be recharged, e.g., by applying an electric current to the battery. Recharging the battery of a mobile computing device generally requires connecting the mobile computing device to an electric grid, which reduces or eliminates its mobility. Consequently, reducing power consumption of mobile computing devices, thereby extending their battery life, is an important objective.

Mobile computing devices can include one or more peripheral sensors. For example, some mobile computing devices include microphones, cameras, accelerometers, and the like. Mobile computing devices can also include one or more processing components to process data collected by the one or more peripheral sensors. For example, some mobile computing devices include central processing units (CPUs), digital signal processors (DSPs), or other processing components.

Mobile computing devices can perform actions based on data collected by their one or more peripheral sensors and processed by their one or more processing components. For example, some mobile computing devices can perform actions in response to voice commands detected by a microphone and processed by a CPU. However, maintaining processing components in an active state so that they can process sensor data consumes significant power.

SUMMARY

This specification describes technologies for implementing low-power, ambient computing on computing devices. The ambient computing system described in this specification operates in one of several different power states at any given time, each power state being defined by a combination of components that are powered on. The combination of components that are powered on can be determined by a machine learning engine that implements a trained model that takes sensor data as inputs and generates an output that can be used to determine which combination of processing components should be activated to further process the sensor data.

For example, in a lowest-power monitoring power state, the system can supply power only to peripheral interfaces and a control subsystem having a power control unit (PCU). In the monitoring power state, the peripheral interfaces can wait to receive input from the environment of the computing device.

When one or more peripheral interfaces receive input from the environment and generate corresponding sensor signals, the system can enter a processing power state, which is a power state that generally consumes more power than the monitoring power state. In the processing power state, the system supplies power to a low-power processing component, e.g., a low-power CPU or a low-power DSP, to perform an initial interpretation of the sensor signals received by the peripheral interfaces. For example, the low-power processing component can determine, based on properties of the sensor signals, that the sensor signals can be interpreted without the aid of a machine learning engine, or that the sensor signals should be further interpreted by a machine learning engine.

The machine learning engine can then use the sensor signals to generate an output that represents one of potentially multiple higher-level power states, each power state being defined by a particular combination of components to be activated. In this specification, a component being activated means supplying additional power to the component sufficient to allow the component to begin processing data. In this context, a component becomes activated by transitioning from an off or retention state to an active processing state. A higher-level power state can be achieved by the system activating more sophisticated, higher-powered, and possibly specialized processing components, e.g., one or more high-power DSPs, a main CPU cluster, or a high-power machine learning engine. For example, the machine learning engine can generate an output indicating that a microphone is receiving audio data corresponding to human voice commands. The output can then cause the system to provide power to a specialized audio DSP for processing the audio data.

These techniques allow for a variety of complex applications that rely on continual monitoring of sensor data to be run in lower consumption power states. For example, if the system determines, from received radar signals, that a user's face is oriented toward a display of the computing device on which the system is implemented, the system can process through the power states to automatically turn on the display of the computing device without receiving any other input from the user.

The subject matter described in this specification can be implemented in particular embodiments so as to realize one or more of the following advantages. An ambient computing system can perform a variety of complex tasks while consuming less power than previous approaches. The power savings and increase in battery life is further improved by using a machine learning engine. The machine learning engine can generate outputs that represent customized combinations of components, which eliminates the need to either wake up all components or no components of the chip. This approach also greatly increases the number of possible power states without overly complicating the hardware control logic. These approaches also allow a system to perform sophisticated tasks that require continual monitoring of the environment without waking up a main CPU cluster of a device. This allows the ambient computing system to be more responsive to changes in its environment while also reducing power consumption. Accordingly, an ambient computing system can provide greater functionality with limited impact on the battery life of a computing device, and increase the total battery life of a computing device with complex ambient state.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like components.

DETAILED DESCRIPTION

Figure 1:
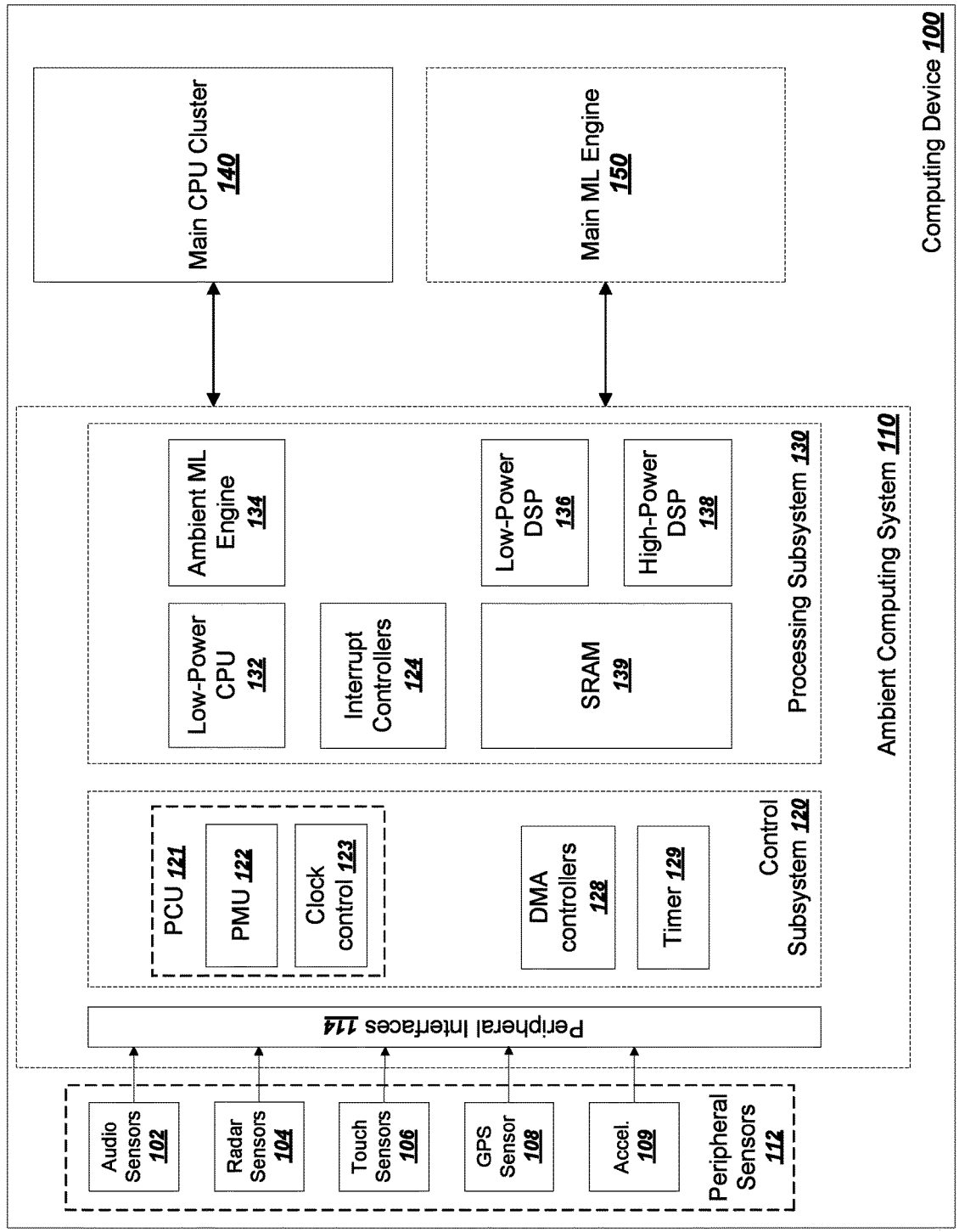
FIG. 1 is a diagram of an example ambient computing system.

FIG. 1 is a diagram of an example computing device 100 that includes low-power, ambient computing capabilities. The device 100 can include a system implemented in an any appropriate computing device, e.g., a smart phone, a smart watch, a fitness tracker, a personal digital assistant, an electronic tablet, a laptop, to name just a few examples. The system of computing device 100 can be used so that the computing device 100 can remain in a low-power state yet continually monitor and respond to inputs from the environment by sequentially waking appropriate processing components of the system. In this specification, the terms wake and activate will be used to mean supplying an increased amount of power to a particular processing component or other electronics circuitry. The system may or may not have been supplying power to a processing component or other circuitry that is being awoken or activated. In other words, a component being awoken or activated may or may not have been completely powered down previously. Waking or activating a processing component can result in the processing component performing a boot process and causing instructions and data for the processing component to be loaded into random-access memory. Alternatively or in addition, waking or activating a processing component can include resuming from a previously suspended state.

The one or more components of the computing device 100 can be implemented on a system on a chip (SoC) within the computing device. An SoC can be an integrated circuit that includes each component of the system on a single silicon substrate or on multiple interconnected dies, e.g., using silicon interposers, stacked dies, or interconnect bridges. Other components of the computing device, including a main CPU cluster 140, can be implemented on the same or on a separate die. The computing device 100 may include components, including the sensors 112, one or more displays, a battery, and other components, that are separate from and independent of the SoC, and may for example be mounted on a common housing.

Briefly, and as described in further detail below, the device 100 includes a number of peripheral sensors 112 configured to generate sensor signals based on input from the environment of the computing device. The device 100 includes a control subsystem 120 for controlling the supply of power and sensor signals to components in the system. And the device 100 includes a processing subsystem 130 for processing sensor signals and generating outputs.

The device 100 also includes a main CPU cluster 140. The main CPU cluster 140 is a component of the computing device that includes one or more general-purpose processors that are separate from the devices in the processing subsystem 130. The processors of the main CPU cluster 140 generally have more computing power than any of the devices in the processing subsystem 130, and therefore, the processors of the main CPU cluster 140 may also consume more power than any of the devices in the processing subsystem 130.

The device 100 can also optionally include a main machine learning (ML) engine 150. The main ML engine 150 is a special-purpose processing device that is configured to perform inference passes through one or more machine learning models. Each inference pass uses inputs and learned parameter values of a machine learning model to generate one or more outputs predicted by the learned model. The main ML engine 150 can include one or more compute tiles. In general, a compute tile is a self-contained computational component configured to execute a set of computations independently. The tiles of the main ML engine 150 can be arranged in a network and programmed so that each tile of the main ML engine 150 is configured to perform operations of one portion of an inference pass through the machine learning model. For example, if the machine learning model is a neural network, each tile in the main ML engine 150 can be configured to compute the computations of one layer of the neural network. A suitable machine learning engine having multiple compute tiles is described in U.S. Pat. No. 9,710,265, which is incorporated herein by reference. The main ML engine 150 also provides higher performance computing power than any of the devices in the processing subsystem 130 of the ambient computing system 110. Therefore, the main ML engine 150 also consumes more power than any of the devices in the processing subsystem 130.

The processing subsystem 130 includes an ambient machine learning engine 134. The ambient ML engine 134 is also a special-purpose processing device that is configured to perform inference passes through one or more machine learning models. When the device 100 includes both a main ML engine 150 and an ambient ML engine 134, the ambient ML engine 134 has fewer compute tiles and therefore has less processing power than the main ML engine 150 and consumes less power than the main ML engine 150. For example, the ambient ML engine 134 can be implemented as one or two tiles, whereas the main ML engine 150 can have 8-16 or more interconnected tiles.

Although not depicted, the computing device 100 can also include one or more other components commonly found on such computing devices, e.g., a display, a modem, a graphics processing unit, a display processor, or a special-purpose image processor, to name just a few examples. These components can be powered down during the low-power states described below and activated if the system determines that the sensor signals match an application requiring their activation.

The device 100 includes a number of peripheral sensors 112. The peripheral sensors 112 include one or more audio sensors 102, one or more radar sensors 104, one or more touch sensors 106, a Global Positioning System (GPS) sensor 108, and an accelerometer 110. The system can include additional, fewer, or alternative peripheral sensors. For example, the system can include a Wi-Fi signal detector, a cellular signal detector, a barometer, a thermometer, a magnetometer, or other types of peripheral sensors.

The peripheral sensors 112 can be devices configured to generate sensor signals in response to environmental inputs. The one or more audio sensors 102, e.g., microphones, can generate audio signals based on sounds in the environment. For example, the audio sensors 102 can generate audio signals corresponding to human speech. The one or more radar sensors 104 can detect radar signals based on reflected radio waves emitted by a transmitter of the computing device. Variations in reflected radio waves can indicate movement in the environment. For example, the radar sensors 104 can generate radar signals that are received due to being reflected off of the user, e.g., when the user is making gestures in proximity to the computing device. Similarly, the one or more touch sensors 106 can generate signals due to touch gestures made by a user of the computing device on a presence-sensitive or pressure-sensitive interface of the device. The GPS sensor 108 can generate signals in response to received location data communications. And the accelerometer 110 can generate signals due to accelerations experienced by the computing device. In this specification, whenever sensor signals are described as being inputs to other processing components, the inputs can be analog electrical signals generated by the sensors themselves, digital representations of the sensor signals, or processed digital representations of the sensor signals that represent one or more properties of the original signals. The peripheral sensors of the computing device 100 can also include an inertial measurement sensor, a barometer, a specific absorption rate proximity sensors, and WiFi network name sensors, to name just a few other examples.

The ambient computing system 110 includes one or more peripheral interfaces 114. The peripheral interfaces 114 can be a component of the computing device 100 that is powered on even when the device is in its lowest power state. The peripheral interfaces 114 can include any appropriate peripheral interface for converting inputs received from the peripheral sensors 112 into sensor signals to be used by the ambient computing system 110. For example, the peripheral interfaces 114 can include a pulse density modulation (PDM) interface, an inter-IC sound (I2S) interface, an inter-integrated circuit (I2C) interface, an I3C interface, a time division multiplexed (TDM) interface, and a serial peripheral interface (SPI), to name just a few examples.

Each of the peripheral interfaces 114 is configured to generate a respective interrupt upon detecting an environmental input. In general, each interrupt can identify a source of the sensor data, e.g., an identifier of a peripheral interface or sensor responsible for the interrupt. The interrupts are received and processed by one or more interrupt controllers 124. For example, upon receiving an interrupt, the interrupt controller 124 can wake a power control unit (PCU) 121, which includes a power management unit (PMU) 122 and a clock control unit 123. The PMU 122 can control which components of the device 100 receive power and how much power each component receives. The clock control unit 123 can control the frequency at which the components of the device 100 operate. In some implementations, each processing component has a different clock frequency that is a multiple or a fraction of a base clock frequency. By having a clock frequency that is a multiple or a fraction of a base clock frequency, each processing component can more efficiently exchange signals with other processing components.

Upon receiving an interrupt, the PCU 121 can determine based on the source of the interrupt which other components of the ambient computing system 110 should be activated in order to further process the sensor signals causing the interrupt. In order to provide processing support for such components, the PCU 121 can wake the static random access memory (SRAM) 139 and the system communications fabric. The fabric is a communications subsystem that communicatively couples the internal components of the ambient computing system 110, their communications to external components, or some combination of these. The fabric can include any appropriate combination of communications hardware, e.g., buses or dedicated interconnect circuitry.

The static random access memory (SRAM) 139 can be a general purpose random-access memory device that can be shared by multiple processing components of the processing subsystem 130. For example, the SRAM 139 can store sensor signals, processor instructions and data, system outputs, and other data, e.g., neural network parameters of neural network models that are or will be implemented by the ambient ML engine 134. In general, an SRAM is distinguishable from dynamic random-access memory (DRAM) in that an SRAM need not be periodically refreshed. As described in more detail below, the SRAM 139 is accessible to the processing components in the processing subsystem 130 directly or through one or more DMA controllers. In some implementations, the SRAM 139 includes multiple banks, which can each store substantially similar amounts of data, e.g., 1, 10, or 100 MB each. In addition, each individual bank can include multiple blocks that can be individually powered-down when entering the low-power state. By carefully sequencing the order that the blocks are powered-down amongst the four banks, the SRAM address space can remain contiguous.

When the PCU 121 wakes the SRAM 139, the PCU 121 can wake fewer than all of the blocks or all of the memory banks of the SRAM 139. The PCU 121 can instead wake only a number of blocks that is sufficient for the next component of the processing subsystem 130 to determine whether to further escalate powering up of components of the device 100.

The PCU 121 can also supply different power levels to different blocks of the SRAM 139. For example, in the monitoring power state, the PMU 122 can supply a lower, retention voltage to the entire SRAM 139 to reduce its power consumption. The PMU 122 can also supply the retention voltage to the SRAM 139 if no processing components need to access to the SRAM 139. In the processing power state, the PMU 122 can provide normal voltage to all or portions of the SRAM 139 and lowered or no voltage to other parts of the SRAM 139.

During the process of handling an interrupt, the ambient computing system 110 can also wake one or more DMA controllers 128. The DMA controllers 128 can manage DMA pathways that allow higher data bandwidth for incoming sensor signals. For example, a DMA controller 128 can be used to continuously stream audio data from a microphone into the SRAM 139 for access by processing components in the processing subsystem 130. Conversely, a DMA controller can also be used to continuously stream audio data stored in the SRAM 139 for output as sound through one or more speakers. The DMA controllers 128 can also be used to stream any appropriate sensor data into the SRAM 139, but using programmed IO may be computationally cheaper than activating a DMA controller for small quantities of data. Thus, the ambient computing system 110 can activate and use the DMA controllers 128 for relatively high-bandwidth sensor data, e.g., audio data and radar data, and can used programmed IO for other types of sensor data.

After preparing the fabric and the SRAM 139, the PCU 121 can then use the interrupts to determine which other component of the processing subsystem 130 to wake. For example, the PMU 122 can control whether power is provided to the low-power CPU 132, the low-power DSP 136, or other components of the processing subsystem 130 depending on which of one or more sensors generated an interrupt. In some implementations, the peripheral interfaces 114 and the components of the control subsystem 120 are the only components of the device 100 that are powered on in a monitoring power state, which is a power state in which the system is waiting to receive interrupts due to environmental inputs to the computing device.

The processing components of the processing subsystem 130 include a low-power CPU 132, an ambient ML engine 134, a low-power DSP 136, and a high-power DSP 138. In some implementations, the processing subsystem has multiple instances of one or more of these components, e.g., multiple low-power DSPs or multiple high-power DSPs. For example, the processing subsystem 130 can have one high-power DSP that is dedicated to processing audio signals and a separate high-power DSP that is dedicated to processing radar signals. Alternatively or in addition, the processing subsystem 130 can have a high-power DSP that is dedicated to processing image data.

In the monitoring power state, the processing components in the processing subsystem 130 can be maintained in a retention mode. The PCU 121 can maintain a component in retention mode by reducing or eliminating power that is provided to the component. For example, in the retention mode, the PCU 121 can supply a processing component with just enough power to maintain register states, but not enough power to process data in the registers.

The low-power CPU 132 can be a general-purpose programmable processor that includes registers, control circuitry, and an arithmetic logic unit (ALU). In general, the low-power CPU 132 consumes less power than the main CPU cluster 140 of the computing device, and may contain fewer processing cores. In some implementations, the low-power CPU 132 is primarily a scalar processor that operates on single instructions and single data inputs.

The low-power CPU 132 can receive interrupts and sensor signals when the system enters the processing power state. Based on the type of sensor signals the lower-power CPU 132 receives and based on the properties of those sensor signals, the low-power CPU 132 can determine that other components of the system should be activated, e.g., the communications fabric, the DMA controllers 128, the SRAM 139, or some combination of these. After activating these components, the low-power CPU 132 can optionally return to a non-operational state.

The low-power CPU 132 can provide the sensor signals, or a processed version thereof, to the ambient ML engine 134 for further interpretation. For example, if the low-power CPU 132 receives sensor signals corresponding to accelerometer input, the low-power CPU 132 can determine that the ambient ML engine 134 should further process the sensor signals. For example, the ambient ML engine 134 can then further process the sensor signals to determine that the signals represent walking, jogging, biking, falling, or traveling in a car.

The low-power CPU 132 can also bypass the ambient ML engine 134 for some signals. If, for example, the low-power CPU 132 receives a sensor signal corresponding to a simple touch input on a touch interface of the computing device, the low-power CPU 132 can process the touch input without the aid of other processing components, e.g., by causing the display of the computing device to be turned on by the main CPU cluster 140 or a graphics processor. The low-power CPU 132 can also determine that the main CPU cluster 140 of the computing device, or another component of the computing device outside of the device 100, should further process certain sensor signals. The low-power CPU 132 can make such a determination, for example, if it determines that no other processing components in the device 100 can properly process the sensor signals.

One task of the ambient ML engine 134 is to use sensor signals to perform an inference pass over a model to generate an output that may trigger waking other processing components to further process the sensor signals. In other words, the ambient ML engine 134 can receive sensor signals, or a processed version thereof generated by the low-power CPU 132 or another processing component, and the ambient ML engine 134 can generate an output that represents which other processing components should further process the sensor signals. The output generated by the ambient ML engine 134 can explicitly specify a combination of processing component IDs or an identifier of an enumerated power state or the output can be a representation of a power state that is interpreted by a low-power processing component, e.g., the low-power CPU or the low-power DSP, in order to identify other higher-power processing components that should process the sensor signals. As part of this process, the low-power processing component can explicitly or implicitly determine whether any other processing is required. For example, the low-power processing component can determine, based on the output of the machine learning engine, that no further processing is required and that the system can transition back to the monitoring power state.

In the lowest-level monitoring power state, the PCU 121 can keep the ambient ML engine 134 in a low-power state or powered down completely. In the processing power state, the PCU 121 may or may not provide power to the ambient ML engine 134 depending on what sensor signals are available at the peripheral interfaces 114 and how the low-power CPU 132 or the low-power DSP 136 interpret the signals. In some implementations, the low-power DSP 136 or the low-power CPU 132 interpret the signals to instruct the PCU 121 to provide power for an additional, intermediate power state, in which the ambient ML engine 134 is also powered on for the inference pass, but no other high-power processing components are yet powered on.

The ambient ML engine 134 can also implement other machine learning models for processing sensor signals. For example, the ambient ML engine 134 can implement a simplified speech recognition model that allows the ambient ML engine 134 to recognize some voice-based commands. Because the model may be installed on a mobile computing device with limited memory capacity, the number of recognized commands may be smaller than for online voice recognition processes.

The ambient ML engine 134 can alternatively or in addition implement a machine learning model that provides on-chip automatic speech recognition. In other words, the ambient ML engine 134 can perform inference passes through the model in order to generate a live transcription of speech captured in the audio signals.

As another example, the ambient ML engine 134 can implement a text-to-speech model that generates audio output signals from particular text inputs, in which the audio output signals can be interpreted as human speech in a particular language by users. In some implementations, the device 100 can use a speech recognition model and the text-to-speech model in tandem to provide a low-power dialogue engine. For example, after the ambient ML engine 134 recognizes a particular command, the low-power CPU 132 can take particular actions to effectuate the command and also to provide a particular text response back to the ambient ML engine 134. The ambient ML engine 134 can then use the text-to-speech model to generate an audio output representing a response to the initial command. In some implementations, the entire data flow of speech recognition, action execution, and text-to-speech response can be performed without ever waking up the main CPU cluster 140 of the device.

For example, if a user provides the voice command, "louder," the ambient ML engine 134 can generate an output representing that the audio signals corresponding to a voice command to increase the volume of music being played by the device. The machine-learning engine 134 can provide the output to the low-power CPU 132, which can effectuate the command by issuing a signal to one or more integrated speaker subsystems. The low-power CPU 132 can then provide a text response, "volume at level 5," to the ambient ML engine 134. The ambient ML engine 134 can then process the text response with the text-to-speech model to generate an audio output, which the device can play over the one or more integrated speaker subsystems. Thus, the ambient computing system 110 process the entire dialogue sequence without waking up the main CPU of the device.

The ambient ML engine 134 can also implement any of a variety of other models. The ambient ML engine 134 can also implement a gesture recognition model that interprets features of hand gestures made by a user of the computing device. For example, the inputs to the model can be processed radar signals received by the computing device, and the output of the model can be predictions of gestures that the user has made. Each hand gesture can correspond to a particular command, and the ambient ML engine 134 can provide the output to the low-power CPU 132, or another processing component, for further action.

The ambient ML engine 134 can include one or more memory banks for storing model parameters and other model configuration information. For example, the machine-learning engine 134 can store data representing neural network connections and neural network parameters. The ambient ML engine 134 can include one or more multiply accumulate (MAC) units and one or more sum registers for computing neural network activations or other neural network layer outputs, and a controller for controlling data exchange between the memory banks and the MAC units. The ambient ML engine 134 can also include instruction memory, direct memory access paths, registers, and other processing components. In some implementations, the ambient ML engine 134 is a machine learning compute tile that is configured to accelerate the computation of machine learning inference passes.

The low-power DSP 136 and the high-power DSP 138 are special-purpose processors configured for efficient decoding and processing of highly-vectorized signals. The processing subsystem 130 can include a variety of DSPs that are designed for different purposes. For example, the processing subsystem 130 can include a DSP that is configured to process radar signals, a DSP that is configured to process audio signals, a DSP that is configured to perform dataplane algorithms, a DSP that is configured to process wireless communications signals, and a DSP that is configured to process GPS signals, to name just a few examples.

As described above, the low-power DSP 136 can perform the initial interpretation of sensor signals from the control subsystem 120. The low-power DSP 136 can also perform other signal processing tasks as well. In general, high-power DSPs consume higher levels of power than low-power DSPs because they have more active registers, they access and process more data in parallel, because they rely more heavily on memory operations, or some combination of these.

The control subsystem 120 can also include a timer 129, which is an electronic timer that can detect system malfunctions and resolve those malfunctions. During normal operation, the system can regularly reset the timer 129 to prevent the timer 129 from timing out. If, e.g., due to a hardware fault or a program error, the system fails to reset a timer, the timer will elapse and generate a timeout signal. The timeout signal can be used to initiate one or more corrective actions. A corrective action can include placing the system in a safe state and restoring normal system operation.

Figure 2:
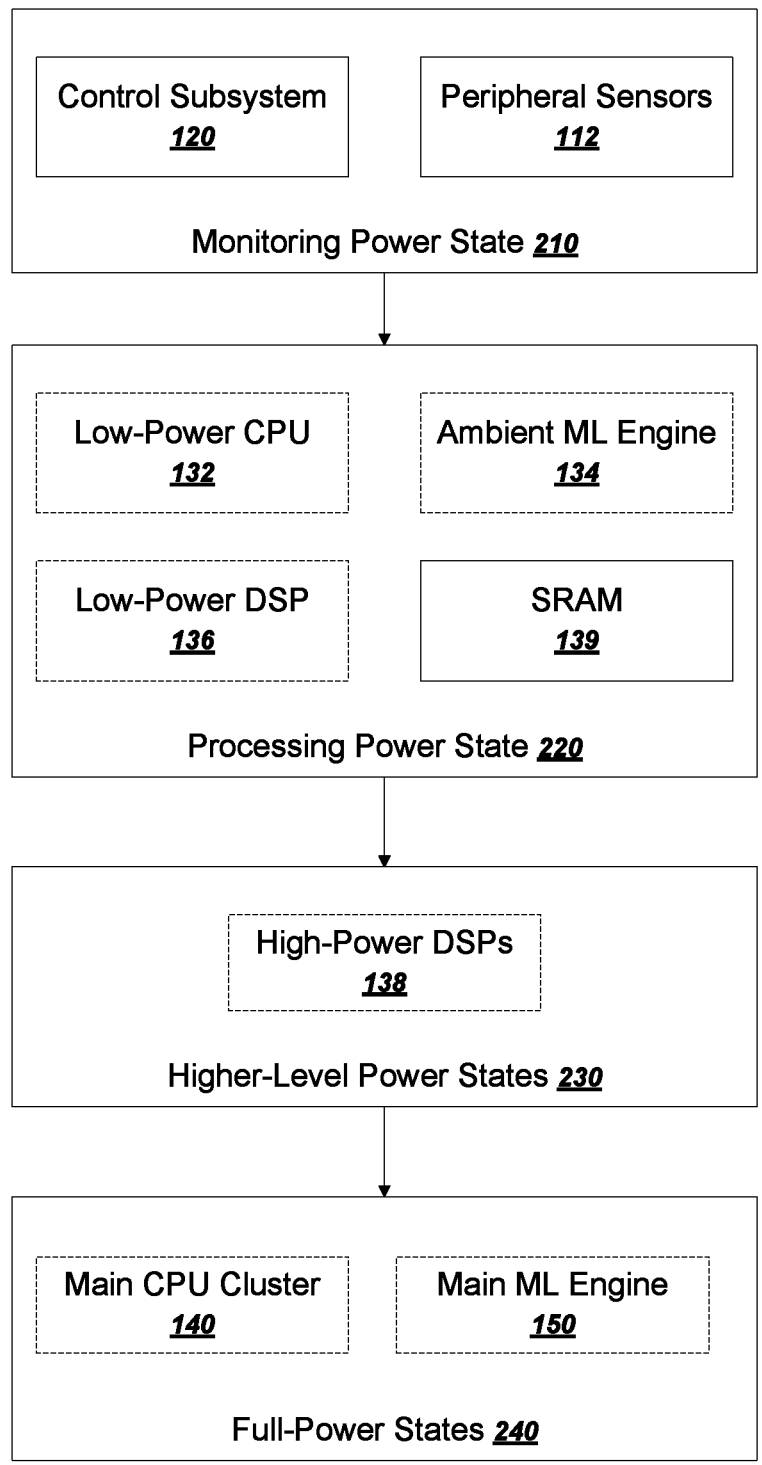
FIG. 2 is a state diagram of power states of an example ambient computing system.

FIG. 2 is a state diagram of the power states of an example ambient computing system. FIG. 2 illustrates the additional components that can be turned on at each subsequent power state.

In FIG. 2, a monitoring power state 210 is the lowest power state of the system. During the monitoring power state, the fewest number of components are powered on by the system. For example, in some implementations, only one or more components of the control subsystem 120 and the peripheral interfaces 114 receive power in the monitoring power state. Other components can be powered-down during the monitoring power state 210. The PCU 121 can then provide power to the other components of the control subsystem 120 when the PCU 121 detects the presence of new sensor data at one or more peripheral interfaces 114.

In the monitoring power state, the system waits for an interrupt, e.g., due to a sensor signal corresponding to an input from the environment or due to a timer timing out. If the system receives an interrupt, the system can transition from the monitoring power state 210 to a processing power state 220. In the processing power state 220, the PMU 122 can supply power to the SRAM 139 and any combination of the low-power CPU 132, the ambient ML engine 134, or the low-power DSP 136.

Upon receiving an interrupt, the interrupt controllers 124 can instruct the PMU 122 to supply power to one of the low-power processing components, transitioning the system to the processing power state 220. As described above, the low-power processing component is designed to be the first component to be woken in the processing subsystem when interrupts are detected. The low-power processing element can be, for example, a low-power CPU, e.g., the low-power CPU 132 of the processing subsystem 130, or another low-power processor, e.g., the low-power DSP 136, or some combination of these. In some implementations, the system uses either the low-power CPU 132 or the low-power DSP 136 depending on which interrupts are received. For example, the system can use the low-power CPU 132 if the interrupt is from a GPS sensor, the system can use the low-power DSP 136 if the interrupt is from an audio sensor, and the system can use the low-power DSP 136 if the interrupt is due to a timer.

The low-power processing component, e.g., the low-power CPU 132 or the low-power DSP 136, can then determine whether to wake the ambient ML engine 134 depending on properties of the sensor signals. For example, if the low-power DSP 136 classifies audio signals as corresponding to noise rather than human speech, the low-power DSP 136 can determine not to invoke the ambient ML engine 134 at all.

The low-power processing component can also program the ambient ML engine as part of the activation process. For example, the low-power processing component can indicate to the ambient ML engine which of multiple machine learning models to use, and can use a DMA pathway to swap instructions and parameter data for the applicable model into the SRAM.

The ambient ML engine 134 can process the one or more sensor signals to generate an output that represents one or more other processing components that should further process the sensor signals. For example, the ambient ML engine 134 can generate an output representing that the high-power DSPs 138 or the main CPU cluster 140 should further process the sensor signals. The low-power processing components can interpret the output of the ambient ML engine to transition the system into one of the higher-level power states 230 and can instruct the PCU 121 to provide power to components needed to implement the higher-level power state, e.g., the high-power DSP 138.

The system can further transition to a full-power state 240 during which the main CPU cluster 140, the main ML engine 150, or both, are powered on. The full-power states 240 are likely to be periods of time during active use of the computing device by a user, e.g., during a web-browsing session that uses the main CPU cluster 140 or during a voice-dialog session that uses one or more speech recognition and audio generation neural networks on the main ML engine 150.

This cascade of powering on components only as they are needed reduces the power consumption of the system while still allowing the system to rapidly respond to inputs at all times.

Once a particular processing component finishes processing sensor signals, the PCU 121 can stop providing power to that processing component, which further reduces power consumption.

In some cases, even the low-power CPU 132, ambient ML engine 134, and the low-power 136 DSP may not be able to fully process certain sensor signals. In such cases, the system can transition to a higher-level power state 230 in which the system provides power to the high-power DSP 138 or the main CPU cluster 140.

Once all processing is complete, the system can transition back to the monitoring power state 210, where the system awaits interrupts from new sensor data.

Figure 3:
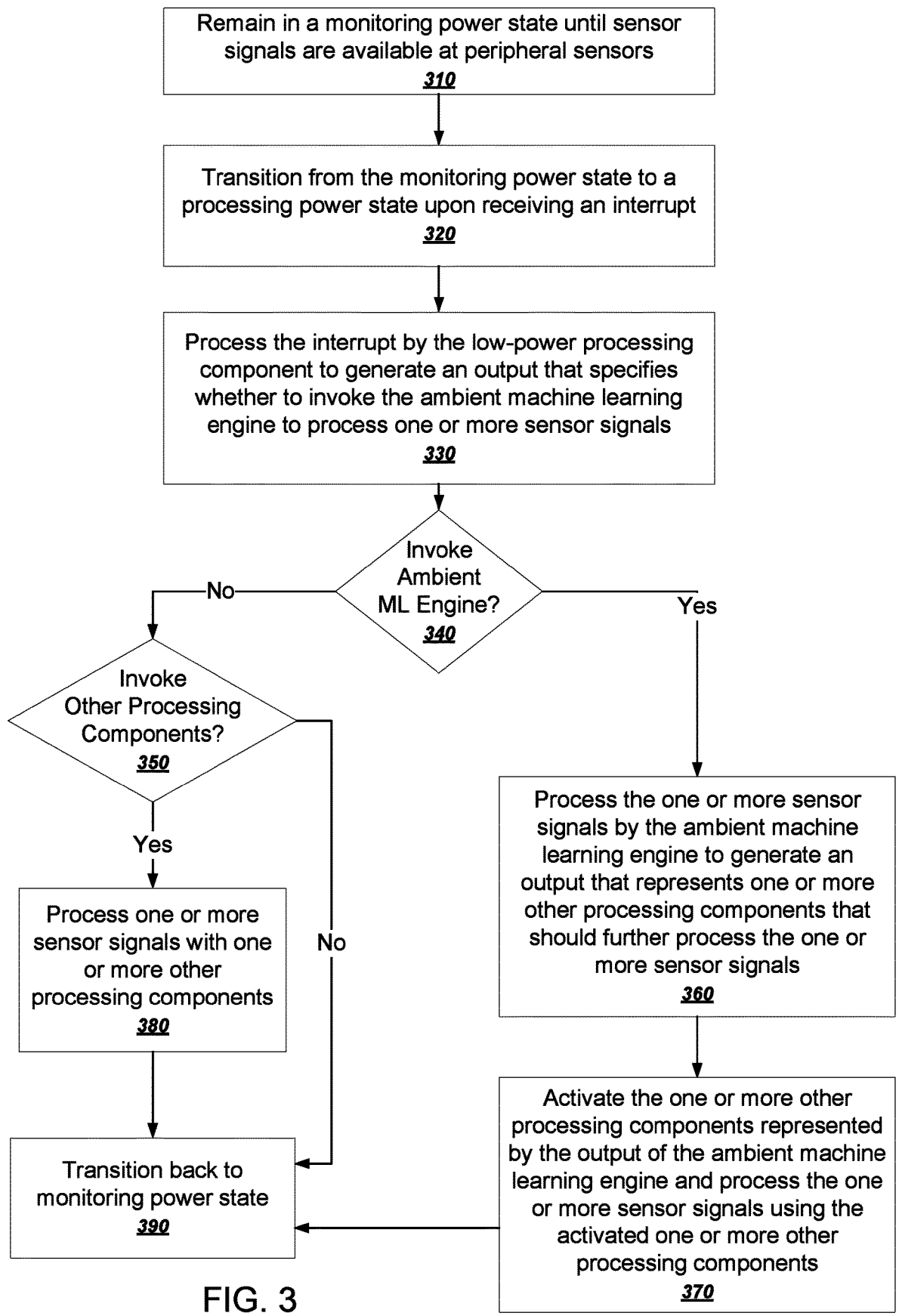
FIG. 3 is a flowchart of an example process for successively activating additional processing components in the ambient computing system.

FIG. 3 is a flowchart of an example process for successively activating additional processing components in the ambient computing system as those additional processing components are needed. For convenience, the process will be described as being performed by the ambient computing system, or by one or more components of the system. The system can include the components described in reference to FIG. 1, including one or more peripheral interfaces configured to generate sensor signals, an interrupt controller, and one or more processing components including a low-power CPU, an ambient ML engine, one or more DSPs, or some combination of these.

The system is initially in the monitoring power state, which is the lowest power state in which the system can respond to inputs. In the monitoring power state, the system can maintain components of a control subsystem in an operational state and components of the processing subsystem, e.g., the low-power CPU, the ambient ML engine, and other processing components, in a non-operational state. Maintaining these components in the non-operational state involves providing no power to them, or providing a level of power that is below a threshold. The system can provide some components some power in the monitoring power state, e.g., to maintain a state of volatile memory devices. It can alternatively or in addition provide other components, e.g., ambient ML engine, with no power during the monitoring power state.

The system remains in the monitoring power state until determining that one or more sensor signals are available at the one or more peripheral interfaces (310).

The system transitions from the monitoring power state to a processing power state upon receiving an interrupt (320). As described above, the interrupt can be generated either due to one or more sensor signals being generated by one or more peripheral interfaces or due to a timer timing out.

The interrupt controller can also automatically ignore particular sensor signals. For example, if the computing device on which the ambient computing system is implemented has location services turned off, the interrupt controller can simply cause the system to ignore location data signals without transitioning to the processing power state.

Transitioning to the processing power state causes the system to activate a low-power processing component, e.g., the low-power CPU or a low-power DSP. Activating the low-power processing component can involve issuing, by an interrupt controller, an interrupt a signal that wakes the low-power processing component. Issuing the interrupt can cause data to be stored in interrupt registers that the low-power CPU can later read and interpret. The interrupt registers can store data that describes the source of the sensor signals. The interrupt controller can also instruct the PCU to provide power to the low-power CPU.

The low-power processing component processes the interrupt to generate an output that specifies whether to invoke the ambient ML engine to further process one or more sensor signals (330). This decision can involve determining that the one or more sensor signals have a particular property, e.g., audio data having characteristics of human speech or radar data having characteristics of hand gestures.

If the low-power processing element determines not to invoke the ambient ML engine (340), the low-power processing component can still determine whether other processing components should process the one or more sensor signals (branch to 350). In other words, although the decision pathway through the ambient ML engine can be used for many situations, the ambient computing system can also support use cases for processing sensor signals that do not invoke the ambient ML engine at all.

If other processing components should process the one or more sensor signals (350), the ambient computing system can process the one or more signals with one or more other processing components (branch to 380). For example, the low-power DSP can determine that received barometer or accelerometer signals should be further processed by the low-power CPU instead of the ambient ML engine. In that case, the low-power DSP can invoke the low-power CPU to further process the sensor signals without waking the ambient ML engine. After processing, the system can transition back to the monitoring power state (390).

The low-power processing component can also determine that the sensor signals need no further processing, e.g., if the audio or radar signals are actually just noise. In that case, the system can simply transition back to the monitoring power state (branch to 390) without invoking other processing components. By terminating the process early, without activating the ambient ML engine or other processing components, the system can achieve significant power savings.

If the low-power processing element determines to invoke the ambient ML engine (340), the ambient ML engine processes the one or more sensor signals to generate an output that represents one or more other processing components that should further process the one or more sensor signals (branch to 360). The ambient ML engine can use a variety of appropriate machine learning models. In general, the input to the model is one or more features of one or more sensor signals, and the output is an inference that the low-power processing element can use to decide whether further processing is required by other processing components of the ambient computing system.

For example, the ambient ML engine can generate an output that the low-power processing element interprets as meaning that a special-purpose audio DSP should further process the one or more sensor signals, e.g., when a text-to-speech response is required, or that a main CPU cluster or the main ML engine should further process the one or more sensor signals.

As one example, the low-power DSP can process microphone signals and generate an output which indicates that human-generated noise is not actual speech. In that case, the low-power DSP would not activate the ambient ML engine to further process the sensor signals. On the other hand, the low-power DSP can process other microphone signals and generate an output which indicates that the human-generated noise is speech. In that case, the low-power DSP can activate the ambient ML engine to further process the sensor signals.

The system activates the one or more other processing components represented by the output of the ambient machine learning engine and processes the one or more sensor signals using the activated one or more other processing components (370). The additional activated processing components can include processing components of one or more higher-level power states, e.g., a high-power DSP. The additional activated processing components can also be processing components of one or more full-power states, e.g., a main CPU cluster, a main ML engine, or some combination of these.

For example, the combination of sensor signals can indicate that the user has started looking at the device. The output of the ambient ML engine can be used to map the features of those sensor signals to a program that requires the main CPU cluster to be engaged to turn on the display of the computing device. As another example, the combination of sensor signals can indicate that the user has issued a voice command. The output of the ambient ML engine can be used to map the features of those sensor signals to a program that requires the main ML engine to generate a text-to-speech response, which may also require activating the main CPU cluster to perform online speech recognition.

After the activated processing components process the sensor signals, the low-power processing component can shut down those processing components or instruct the PCU to do so. Thereafter, the low-power processing component can also instruct the PCU to transition back to the monitoring power state to wait for a next interrupt (390).

Figure 4:
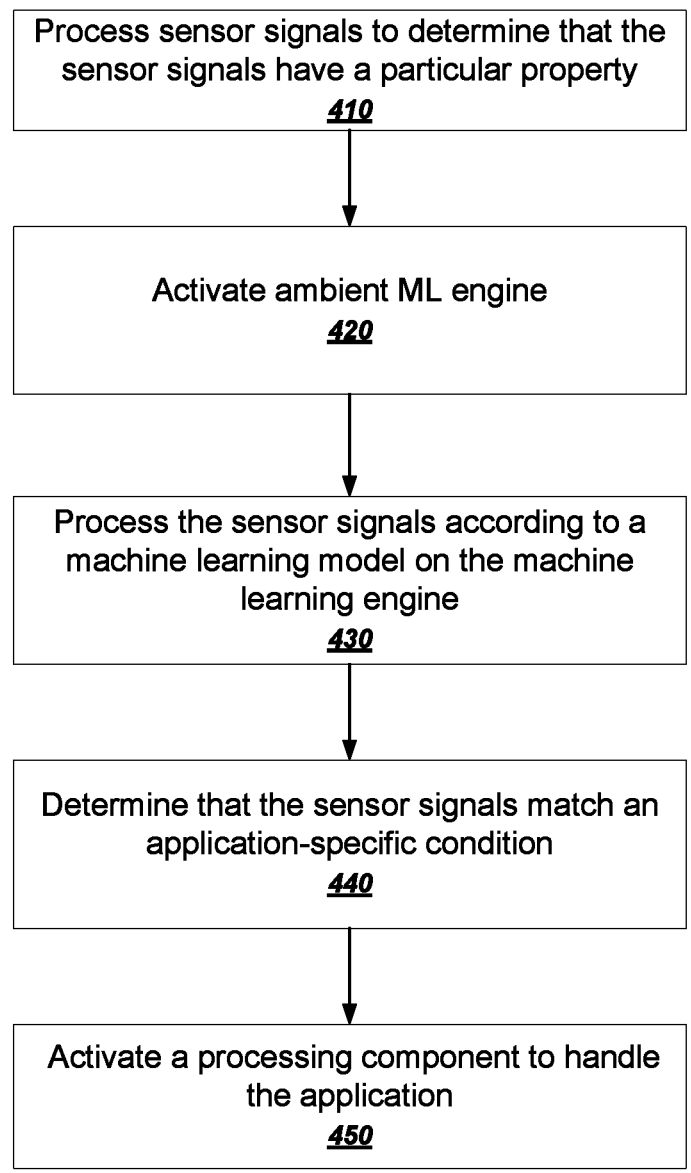
FIG. 4 is a flowchart of an example process for activating a particular processing component to handle an application corresponding to an application-specific condition.

FIG. 4 is a flowchart of an example process for activating a particular processing component in the ambient computing system to handle an application corresponding to an application-specific condition. For convenience, the process will be described as being performed by the computing system, or by particular components of the computing system. Again, the computing system can include the components described in reference to FIG. 1, including one or more peripheral interfaces configured to generate sensor signals, and one or more processing components including a low-power processing component, e.g. the low-power CPU 132 or the low-power DSP 136, an ambient ML engine 134, and one or more high-power DSPs 138. During the example process, the system is initially in the processing power state but can transition to a higher-power processing state.

The low-power processing component processes sensor signals generated by the one or more peripheral interfaces to determine that particular sensor signals have a particular property (410). Determining that particular sensor signals have a particular property can involve determining that the sensor signals are of a particular type, e.g., audio data corresponding to human speech or radar data corresponding to hand gestures.

In response to determining that the sensor signals have a particular property, the system activates an ambient ML engine (420) as described in reference to FIG. 3.

The ambient ML engine performs an inference pass over a machine learning model using the sensor signals to generate a model output (430). The ambient ML engine can implement any of a number of machine learning models, including speech recognition models, gesture recognition models, and text-to-speech models, represented as neural network models or any other appropriate machine learning model. Speech recognition models receive as input sensor signals representing human speech and process those signals to generate corresponding text. Gesture recognition models receive radar inputs representing hand gestures and identify and decode those hand gestures. And text-to-speech models receive as input text and process that text to generate corresponding speech.

In some implementations, the ambient ML engine stores multiple machine learning models, and properties of the sensor signals cause the low-power DSP or low-power CPU to select one or more models over which the ambient ML engine should perform an inference pass. In some cases, the ambient ML engine can perform inference passes multiple times on different models using the same sensor signals.

As described above, a first type of machine learning model is a model that can be used to identify which other components of the ambient computing system to activate for further processing. In this case, the input is sensor signals and the machine learning output can be an output that can be mapped to one or more identifiers for each of one or more processing components.

Another type of machine learning model that can be implemented by the ambient ML engine is a hot word model that performs simplified speech recognition to identify when a user speaks a relatively small set of hot words, e.g., "Ok phone." In this case, the input is audio signals, and the output is one or more identifiers of an enumerated set of commands. For example, one of the enumerated commands can be to listen for additional speech input, which may for example be handled by the more sophisticated main ML engine.

Another type of machine learning model that can be implemented by the ambient ML engine is a media identification model. In this case, the input is audio signals, and the model output is one or more properties of media for the audio signals, e.g., a title of a song, program, TV show, or move, a name of TV or radio channel. For example, the output can be text that identifies background audio as the movie "Braveheart." The ambient computing system can then activate the main CPU cluster to display this information in a notification on a phone screen. In order to implement the media identification model, the device can download updated model parameters, e.g., once per night, week, or month, so that the media that is identified is up-to-date and reasonably current.

Another type of machine learning model that can be implemented by the ambient ML engine is a music identification model. In this case, the input is audio signals, and the model output is one or more properties of a musical work, e.g., a title, author, composer, album, or track of a song. The device can similarly download updated model parameters periodically, e.g., once per night, week, or month, so that the music that is identified is up-to-date and reasonably current.

The memory required to implement one or more of the above-mentioned models may exceed the size of the SRAM on the device. Therefore, the system can use memory overlays to be able to support multiple machine learning models with limited memory space. For example, the system can periodically swap, into the SRAM, model parameters and code for the hot word model and perform an inference pass for audio received over the last few milliseconds. The system can then swap, into the SRAM, model parameters and code for the media identification model and perform a second inference pass for audio received over the last few milliseconds. And the system can then do the same to swap in model parameters and code for the music identification model. In some implementations, the system swaps the overlays into the SRAM using a DMA controller and a DMA pathway into DRAM or a system-level cache that caches data in DRAM.

The system determines that the sensor signals match an application-specific condition (440). For example, the low-power processing component can interpret the output of the ambient ML engine to determine that the sensor signals match a condition for turning on the display of the computing device on which the ambient computing system is implemented. As another example, the low-power processing component can interpret the output of the ambient ML engine to determine that received audio signals correspond to the voice command, "OK Computer, turn on the screen."

In response to determining that the particular sensor signals match an application-specific condition, the system activates a particular processing component to execute a particular application corresponding to the application-specific condition (460). Continuing with the example from the preceding paragraph, the system can activate a processing component to execute program code that causes the display of the computing device to illuminate.

In another example process, the low-power processing component can determine that particular sensor signals are audio signals. The system can then activate the ambient ML engine to further process those audio signals. The ambient ML engine, using an audio processing neural network, can perform an inference pass over a machine learning model to generate an output representing that the audio signals correspond to a particular type of sound, e.g., the sound of a car door slamming. The occurrence of the sound of the car door slamming is an application-specific condition that causes the system to activate a processing component to execute program code that causes the system to record a location of the mobile computing device. Recording the location of the mobile computing device is the application corresponding to the application-specific condition. Such an application might be useful to a user who often forgets where he parked his car.

Figure 5:
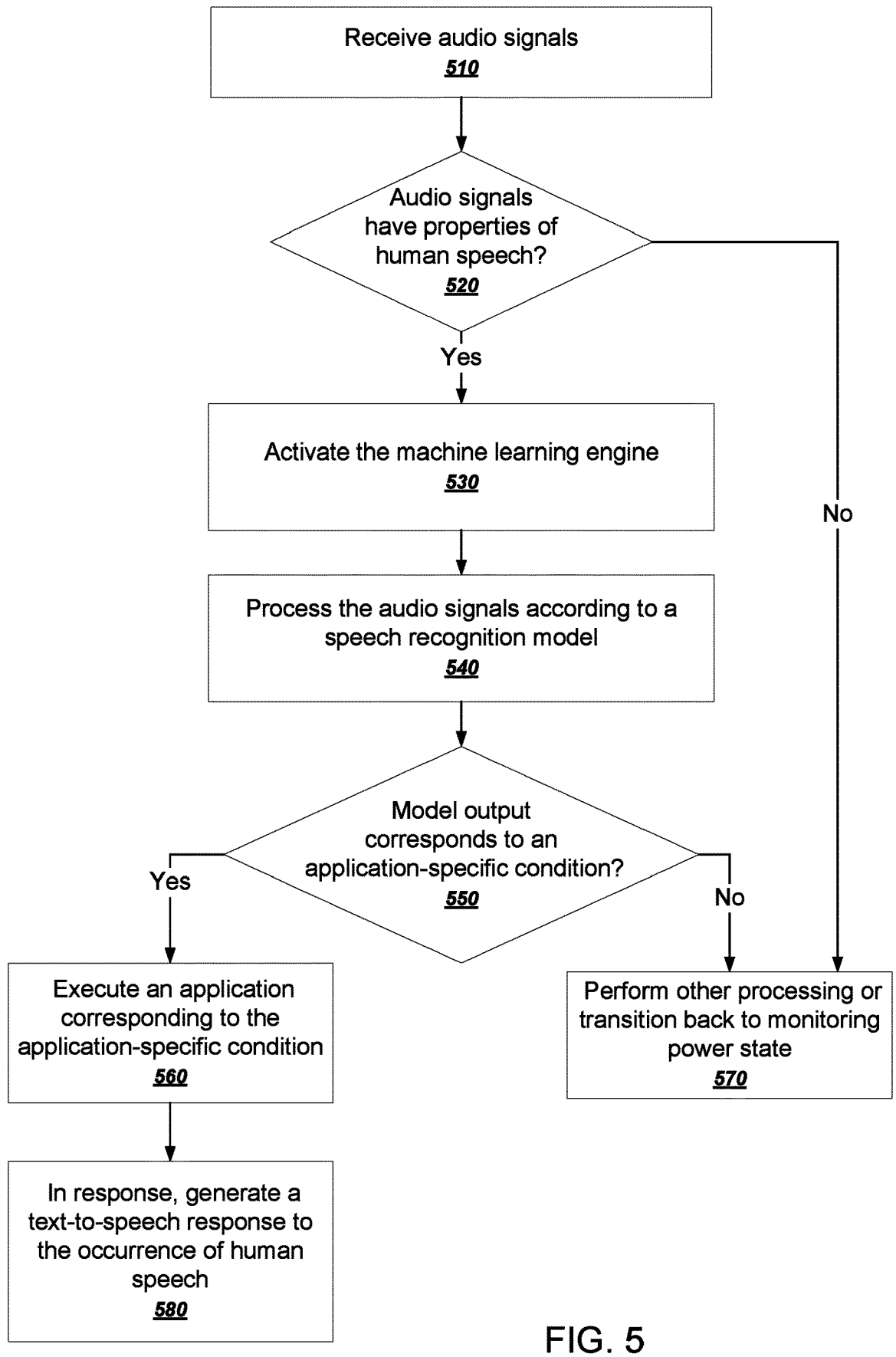
FIG. 5 is a flowchart of an example process for generating a text-to-speech audio response to a voice command.

FIG. 5 is a flowchart of an example process for handling a voice search application. The process will be described as being performed by the ambient computing system, or by particular components of the system.

An audio sensor, e.g., microphone, of the ambient computing system generates audio signals based on an audio input from the environment. For example, the audio sensor can receive human speech corresponding to the question, "OK Computer, what is the weather today?" The audio sensor can generate audio signals that encode that question.

The system receives audio signals (510). If the system is in the monitoring power state, the system can transition to the processing power state upon the interrupt controller determining that the audio signals are available, which can cause the system to activate the low-power DSP. As previously described, activating the low-power DSP can involve sending an interrupt to the low-power DSP and instructing the PCU to supply power to the low-power DSP. If the system is already in the processing power state, the low-power DSP can process the audio signals.

The low-power DSP processes the audio signals and determines whether the audio signals have one or more properties of human speech (520). Determining that the audio signals have one or more properties of human speech can involve, for example, analyzing the frequency content of the audio signals or comparing the audio signals to a known sample of human speech.

If the audio signals do not have one or more properties of human speech (520), the system can perform other processing with or without invoking the ambient ML engine or the system can simply transition back to the monitoring power state (branch to 570). Transitioning back to the monitoring power state saves power by not activating the ambient ML engine or other high-power processing components.

As mentioned above, the ambient ML engine can also use other machine learning models that identify music or other media specifically. Thus, if the audio signals have properties of music or other media, the system can swap in parameters and instructions for the ambient ML engine to perform an inference pass using a model that is specific to those audio types. If the ambient ML engine is able to use the model to identify the music or media being picked up by the microphones, the system can then provide information identifying the music or other media, e.g., as a display notification. Providing a display notification may require waking the main CPU cluster or other high-power processing components, and thus this process may involve transitioning from the processing power state to a full-power state. But the system can save power and extend battery life by only reaching the full-power state when the received audio signals have particular properties according to the low-power DSP and correspond to identifiable music or media according to the ambient ML engine.

If the audio signals have one or more properties of human speech, the system activates the ambient ML engine (branch to 530).

The ambient ML engine processes the audio signals according to a speech recognition model (540). The program code and parameters for the speech recognition model can be swapped into SRAM before or while activating the machine learning engine.

The ambient ML engine then performs an inference pass over the speech recognition model with the input audio signals. The output of the speech recognition model can be text corresponding to the audio signals or an identifier of a command corresponding to the speech. Continuing with the example from the preceding paragraphs, the output of the speech recognition model can be an identifier or a text representation of "OK Computer, what is the weather today?"

The system determines if the model output corresponds to an application-specific condition (550). For example, the low-power DSP can determine, based on the presence of the words "weather" and "today" in the text representation, that the audio signals correspond to an application that retrieves and presents weather data. In other words, the user wants the computing device to provide a weather report and has issued an appropriate voice command.

If the model output does not correspond to an application-specific condition, the system can perform other processing or transition back to the monitoring power state (branch to 570).

If the model output does correspond to an application-specific condition, the system executes an application corresponding to the application-specific condition (560). In general, the system can select a processing component to perform the application corresponding to the application-specific condition, e.g., by swapping into the SRAM program code and data needed to execute the application. For example, if the ambient ML engine can perform automatic speech recognition, the system can swap into the SRAM program code and model parameters needed for the ambient ML engine to recognize the speech.

Alternatively or in addition, the system can invoke other components that are not part of the ambient computing system to perform the application, e.g., by invoking the main CPU cluster or the main ML engine. For example, if the application-specific condition is a voice-command asking for the weather, the system can invoke the main CPU cluster to execute an application that looks up the weather from an online source. Naturally, this action can also require supplying power to networking hardware if not already activated. For example, the system can use an online search engine or a weather database to retrieve the requested weather information.

The system activates a particular processing component to generate a text-to-speech response to the particular occurrence of human speech, which is the application corresponding to the application-specific condition (580). In some implementations, the system can activate an audio DSP to generate the text-to-speech audio response. In some other implementations, the ambient ML engine itself can handle the text-to-speech application by implementing a text-to-speech machine learning model. The text-to-speech machine learning model can be a trained raw audio recurrent neural network. For example, it can be the neural network described in Aaron van den Oord et al., *WaveNet: A Generative Model for Raw Audio*, in arXiv preprint arXiv: 1609.03499 (2016), available at arxiv.org. The output of the text-to-speech model is audio signals, e.g., "Today, you can expect sunny weather with a high of 75 degrees." An audio output device, e.g., speaker, on the computing device can generate audio from the audio signals.

In some implementations, the ambient computing system can recognize audio signals corresponding to human speech and generate a text-to-speech audio response without activating the low-power CPU. For example, the low-power DSP can determine not only that received audio signals correspond to human speech, but that they correspond to a question that will require a text-to-speech response. Based on that determination, and because the low-power CPU may not be able to handle a text-to-speech application, the low-power DSP can send an inference request directly to the ambient ML engine, bypassing the low-power CPU. Bypassing the low-power CPU in such a circumstance reduces the energy consumption of the system.

Figure 6:
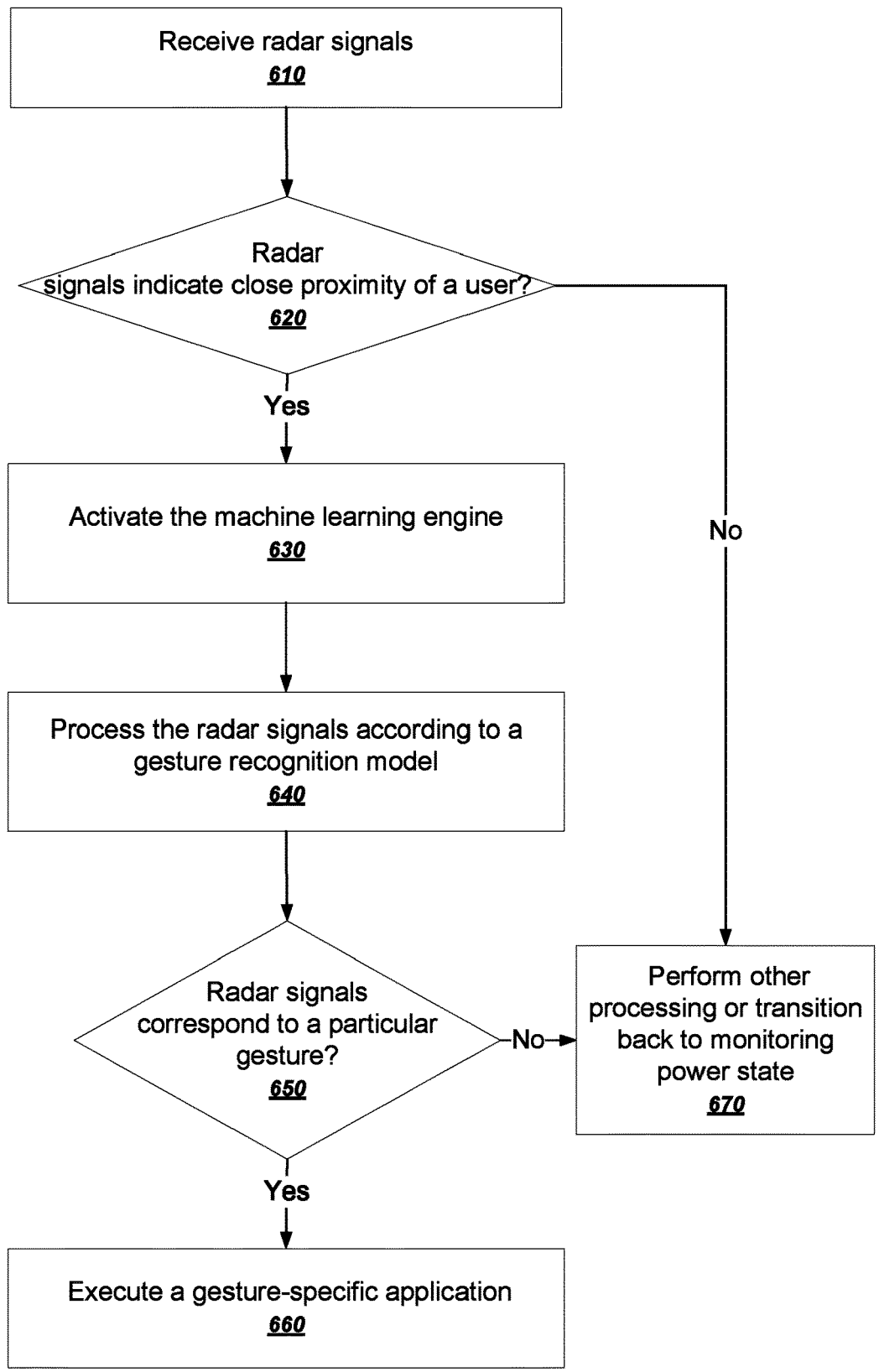
FIG. 6 is a flowchart of an example process for performing a gesture-specific application.

FIG. 6 is a flowchart of an example process for performing a gesture-specific application. The process will be described as being performed by the ambient computing system, or by particular components of the system.

The system receives radar signals (610). For example, one or more radar sensors generate radar signals. If the system is currently in the monitoring power state, the system can transition to the processing power state upon the interrupt controller determining that the radar signals are available, which causes the system to activate the low-power DSP. As previously described, activating the low-power DSP can include instructing the PCU to supply power to the low-power DSP. If the system is already in the processing power state, the system can forward the radar signals to the low-power DSP.

The low-power DSP processes the radar signals and determines whether the signals indicate the close proximity of a user (620). Determining that the radar signals indicate the close proximity of a user can involve detecting signal patterns, e.g., pulses, encoded in radio waves reflected back from the environment and measuring the signal-to-noise ratio of the reflected signal patterns. If the signal-to-noise ratio satisfies a threshold, the system can determine that the signals indicate the close proximity of a user.

In some implementations, the system imposes further low-level processing on the low-power DSP. For example, if the radar signals do indicate the close proximity of a user, the system can then use the low-power DSP to execute a different routine to determine whether the radar signals also indicate gestures.

If the radar signals do not indicate the close proximity of a user, the system can perform other processing without invoking the ambient ML engine or simply transition back to the monitoring power state (branch to 670).

If the radar signals indicate the close proximity of a user, the system activates the ambient ML engine (branch to 630).

The system processes the radar signals according to a gesture recognition model (640). The program code and parameters for the gesture recognition model can be swapped into SRAM before or while activating the machine learning engine. The ambient ML engine can then perform an inference pass over the gesture-recognition model using the input radar signals to generate a model output. For example, the machine learning model can be a gesture recognition model trained to detect and classify particular hand gestures.

The system determines whether the radar signals correspond to particular gesture (650). For example, the low-power DSP can interpret the model output and determine that the model output corresponds to a particular gesture. Alternatively or in addition, the system can make use of the high-power DSP in tandem with the ambient ML engine. In other words, the high-power DSP can perform more sophisticated signal processing on the radar signals to confirm the close proximity of the user concurrently with the ambient ML engine performing an inference pass through the gesture recognition model. If the high-power DSP indicates that a user is present and if the ambient ML engine indicates that the model output corresponds to a particular gesture, then the system can perform a gesture-specific action. By combining the functionality of the high-power DSP with the gesture-recognition model on the ambient ML engine, the system can increase the accuracy of gesture recognitions and reduce the rate of false positive detections.

If the radar signals do not correspond to a particular gesture, the system can perform other processing or transition back to the monitoring power state (branch to 670).

If the radar signals correspond to a particular gesture, the system executes a gesture-specific application (branch to 660). One gesture-specific application can be determining from a gesture whether the user is an owner of the device.

For example, the device can use the radar signals to enable gesture unlocking of the device or gesture passwords. In other words, the system can determine the user is the owner of the device because the features of the gesture matched the features of a gesture previously used to lock the device.

Another gesture-specific application can be illuminating the display of the device in response to the user performing a particular gesture. For example, if the user leans in to look at the display, the model output can indicate that the user is leaning in. In response, the system can activate a processing component to turn on the display of the computing device. This can, for example, allow the user to see notifications on the device just by leaning in or just by moving a hand in a particular way, e.g., waving the hand up or back and forth or in a T-shape.

Another gesture-specific application can be using a camera to interpret facial expressions. For example, if the particular gesture is the user leaning in toward the device, the system can activate a front-facing camera to capture image data of the user's face. The system can then activate the main CPU cluster, the main ML engine, or both to classify a facial expression of the user.

The examples above primarily described the ambient computing system as being implemented as a system-on-a-chip having integrated processing components. However, the same techniques can also be used to implement an ambient computing system using other arrangements of the underlying computing components. For example, one or more processing components of the ambient computing system, including the ambient ML engine, can be implemented as a co-processor or in a stand-alone chip.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client device having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a an ambient computing system comprising:
one or more sensors configured to generate sensor signals;
a controller; and
a plurality of processing components including a low-power processing component, a machine learning engine, and one or more other processing components,
wherein the ambient computing system is configured to perform operations comprising:
remaining in a monitoring power state until the controller receives an interrupt indicating presence of one or more sensor signals, transitioning from the monitoring power state to a processing power state upon the controller receiving the interrupt, wherein transitioning to the processing power state causes the ambient computing system to activate the low-power processing component, determining, by the low-power processing component using the one or more sensor signals, that the machine learning engine should perform an inference pass using the one or more sensor signals, in response, performing the inference pass by the machine learning engine using the one or more sensor signals as input to generate an output that represents one or more other processing components of the ambient computing system that should be activated to further process the one or more sensor signals, activating the one or more other processing components represented by the output of the machine learning engine, and processing the one or more sensor signals by the one or more other processing components represented by the output of the machine learning engine.

Embodiment 2 is the ambient computing system of embodiment 1, wherein receiving an interrupt comprises receiving an interrupt generated by a peripheral interface in response to a sensor receiving an environmental input.

Embodiment 3 is the ambient computing system of any one of embodiments 1-2, wherein the low-power processing component is a low-power CPU.

Embodiment 4 is the ambient computing system of any one of embodiments 1-3, wherein the low-power processing component is a low-power DSP.

Embodiment 5 is the ambient computing system of embodiment 4, wherein the one or more other processing components of the ambient computing system that should be activated to further process the one or more sensor signals comprise a high-power DSP, a main CPU cluster, or a main machine learning engine.

Embodiment 6 is the ambient computing system of any one of embodiments 1-5, wherein the operations further comprise determining, by the low-power processing component, that the output of the machine learning engine represents one or more other processing components of the ambient computing system that should be activated to further process the one or more sensor signals.

Embodiment 7 is the ambient computing system of any one of embodiments 1-6, wherein receiving an interrupt comprises receiving an interrupt generated by a timer in response to the timer timing out.

Embodiment 8 is the ambient computing system of any one of embodiments 1-7, wherein the plurality of processing components share a random-access memory bank, and wherein transitioning from the monitoring power state to the processing power state comprises activating the random-access memory bank.

Embodiment 9 is the ambient computing system of any one of embodiments 1-8, wherein the plurality of processing components are communicatively coupled by a communication fabric, and wherein transitioning from the monitoring power state to the processing power state comprises activating the communication fabric.

Embodiment 10 is the ambient computing system of any one of embodiments 1-9, wherein while the ambient computing system is in the monitoring power state, the ambient computing system maintains the low-power processing component and the machine learning engine in a non-operational state.

Embodiment 11 is the ambient computing system of embodiment 10, wherein maintaining the low-power processing component and the machine learning engine in the non-operational state comprises providing no power or providing a level of power that is below a threshold.

Embodiment 12 is the ambient computing system of embodiment 10, wherein while the ambient computing system is in the monitoring power state, the ambient computing system maintains an SRAM and a communications fabric in a non-operational state.

Embodiment 13 is the ambient computing system of embodiment 10, wherein while the ambient computing system is in the monitoring power state, the ambient computing system maintains a control subsystem in an operational state and a processing subsystem in a non-operational state.

Embodiment 14 is the ambient computing system of any one of embodiments 1-13, wherein the machine learning engine implements a machine learning model that takes as input features of one or more sensor signals and generates an output that represents one or more other processing components of the ambient computing system that should further process the one or more sensor signals.

Embodiment 15 is the ambient computing system of any one of embodiments 1-14, wherein the operations further comprise transitioning from the processing power state to the monitoring power state when processing of the sensor signals by the one or more other processing components is complete.

Embodiment 16 is the ambient computing system of any one of embodiments 1-15, wherein the machine learning engine is an ambient machine learning engine, and wherein the one or more other processing components include a main machine learning engine, the ambient machine learning engine having less processing power than the main machine learning engine.

Embodiment is an ambient computing system comprising:
  one or more sensors configured to generate sensor signals; and
  a plurality of processing components including a low-power processing component, a machine learning engine, and one or more other processing components,
  wherein the ambient computing system is configured to:
    determine, by the low-power processing component, that particular sensor signals have a particular property;
    in response, activate the machine learning engine;
    perform, by the machine learning engine, an inference pass over a machine learning model using the sensor signals to generate a model output;
    determine that the model output of the machine learning engine matches an application-specific condition; and
    in response, activate one or more of the other processing components to execute a particular application corresponding to the application-specific condition.

Embodiment 18 is the ambient computing system of embodiment 17, wherein determining that the model output of the machine learning engine matches an application-specific condition is performed by the low-power processing component.

Embodiment 19 is the ambient computing system of any one of embodiments 17-18, wherein determining that the particular sensor signals have a particular property comprises determining that the particular sensor signals are audio signals corresponding to human speech.

Embodiment 20 is the ambient computing system of embodiment 19, wherein the application-specific condition is an occurrence of particular human speech, and wherein the application comprises generating a text-to-speech audio response to the particular human speech.

Embodiment 21 is the ambient computing system of embodiment 20, wherein the machine learning engine generates the text-to-speech audio response using a trained raw audio recurrent neural network.

Embodiment 22 is the ambient computing system of embodiment 21, wherein the ambient computing system is configured to recognize the audio signals corresponding to human speech and to generate the text-to-speech audio response without initializing a main CPU cluster.

Embodiment 23 is the ambient computing system of any one of embodiments 17-22, wherein determining that the particular sensor signals have a particular property comprises determining that the particular sensor signals are radar signals that indicate close proximity of a user.

Embodiment 24 is the ambient computing system of embodiment 23, wherein the ambient computing system is a component of a mobile computing device, and wherein the application-specific condition is an occurrence of a particular gesture by a user.

Embodiment 25 is the ambient computing system of embodiment 24, wherein the application comprises turning on a display of the mobile computing device or unlocking the mobile computing device.

Embodiment 26 is the ambient computing system of any one of embodiments 17-25, wherein the ambient computing system is a component of a mobile computing device, and wherein the application-specific condition is an occurrence of a particular type of sound, and wherein the application comprises recording a location of the mobile computing device.

Embodiment 27 is a powered device including an ambient computing system and additional components, the device comprising:
one or more sensors configured to generate sensor signals;
a controller; and
an ambient computing system including a plurality of processing components including a low-power processing component, an ambient machine learning engine, and other processing components,
wherein the ambient computing system is configured to:
remain in a monitoring power state until the controller receives an interrupt,
transition from the monitoring power state to a processing power state upon the controller receiving the interrupt, wherein transitioning to the processing power state causes the ambient computing system to activate the low-power processing component,
process the interrupt by the low-power processing component to generate an output that specifies that the ambient machine learning engine should further process one or more sensor signals,
process the one or more sensor signals by the machine learning engine to generate an output that represents one or more other processing components of the ambient computing system that should further process the one or more sensor signals,
activate, responsive to the output, only the one or more other processing components identified by the output of the machine learning engine as sufficient to process the sensor signals,
process the one or more sensor signals using the one or more other processing components identified by the output of the machine learning engine; and
the controller configured to activate additional components of the powered device responsive to the processed sensor signals.

Embodiment 28 is the powered device of embodiment 27, wherein the machine learning engine is an ambient machine learning engine, and the additional components of the powered device include a main machine learning engine, the ambient machine learning engine having less processing power than the main machine learning engine.

Embodiment 29 is a method comprising performing the ambient computing system operations of any one of embodiments 1-28.

Embodiment 30 is a computer storage medium encoded with a computer program, the program comprising instructions that are operable, when executed by components of an ambient computing system, to cause the ambient computing system to perform the operations of any one of embodiments 1-28.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A device comprising:
one or more sensors configured to generate sensor signals; and
an ambient computing system comprising a plurality of processing components including a machine learning engine and a plurality of other processing components,
wherein the ambient computing system is configured to perform operations comprising:
remaining in a monitoring power state until receiving an interrupt indicating presence of one or more sensor signals generated by one or more of the one or more sensors,
in response to receiving the interrupt, transitioning from the monitoring power state to a processing power state,
performing, in the processing power state, an inference pass by the machine learning engine on a model configured to generate multiple output values that respectively represent a plurality of the other processing components, including using the one or more sensor signals as input to the model to generate an output value of the multiple output values that represents one of the plurality of other processing components of the ambient computing system that should be activated to further process the one or more sensor signals,
activating the other processing component represented by the output value of the machine learning engine, and
processing the one or more sensor signals by the activated other processing component represented by the output of the machine learning engine.

2. The device of claim 1, wherein the plurality of processing components of the ambient computing system share a random access memory bank.

3. The device of claim 2, wherein transitioning from the monitoring power state to the processing power state comprises activating the random access memory bank.

4. The device of claim 1, wherein the one or more other processing components comprise a low-power processing component, and wherein transitioning from the monitoring power state to the processing power state causes the ambient computing system to activate the low-power processing component.

5. The device of claim 4, wherein the ambient computing system is configured to process the one or more sensor signals by the low-power processing component to determine whether the inference pass should be performed by the machine learning engine.

6. The device of claim 4, wherein the low-power processing component is a low-power CPU.

7. The device of claim 4, wherein the low-power processing component is a low-power DSP.

8. The device of claim 1, wherein the one or more other processing components of the ambient computing system that should be activated to further process the one or more sensor signals comprise a high-power DSP, a main CPU cluster, or a main machine learning engine.

9. The device of claim 1, wherein the plurality of processing components are communicatively coupled by a communication fabric, and wherein transitioning from the monitoring power state to the processing power state comprises activating the communication fabric for the one or more other processing components represented by the output of the machine learning engine.

10. The device of claim 1, wherein while the ambient computing system is in the monitoring power state, the ambient computing system is configured to maintain the machine learning engine in a non-operational state.

11. A method performed by a device comprising:
one or more sensors configured to generate sensor signals; and
an ambient computing system comprising a plurality of processing components including a machine learning engine and a plurality of other processing components,
the method comprising:
remaining in a monitoring power state until receiving an interrupt indicating presence of one or more sensor signals generated by one or more of the one or more sensors,
in response to receiving the interrupt, transitioning from the monitoring power state to a processing power state,
performing, in the processing power state, an inference pass by the machine learning engine on a model configured to generate multiple output values that respectively represent a plurality of the other processing components, including using the one or more sensor signals as input to the model to generate an output value of the multiple output values that represents one of the plurality of other processing components of the ambient computing system that should be activated to further process the one or more sensor signals,
activating the other processing component represented by the output value of the machine learning engine, and
processing the one or more sensor signals by the activated other processing component represented by the output of the machine learning engine.

12. The method of claim 11, wherein the plurality of processing components of the ambient computing system share a random access memory bank.

13. The method of claim 12, wherein transitioning from the monitoring power state to the processing power state comprises activating the random access memory bank.

14. The method of claim 11, wherein the one or more other processing components comprise a low-power processing component, and wherein transitioning from the monitoring power state to the processing power state causes the ambient computing system to activate the low-power processing component.

15. The method of claim 14, wherein the method comprises processing process the one or more sensor signals by the low-power processing component to determine whether the inference pass should be performed by the machine learning engine.

16. The method of claim 14, wherein the low-power processing component is a low-power CPU.

17. The method of claim 14, wherein the low-power processing component is a low-power DSP.

18. He method of claim 11, wherein the one or more other processing components of the ambient computing system that should be activated to further process the one or more sensor signals comprise a high-power DSP, a main CPU cluster, or a main machine learning engine.

19. The method of claim 11, wherein the plurality of processing components are communicatively coupled by a communication fabric, and wherein transitioning from the monitoring power state to the processing power state comprises activating the communication fabric for the one or more other processing components represented by the output of the machine learning engine.

20. The method of claim 11, wherein while the ambient computing system is in the monitoring power state, the ambient computing system is configured to maintain the machine learning engine in a non-operational state.

* * * * *